C. J. COLLING.
COVER FOR COOKING UTENSILS.
APPLICATION FILED MAR. 19, 1908.
909,284.
Patented Jan. 12, 1909.
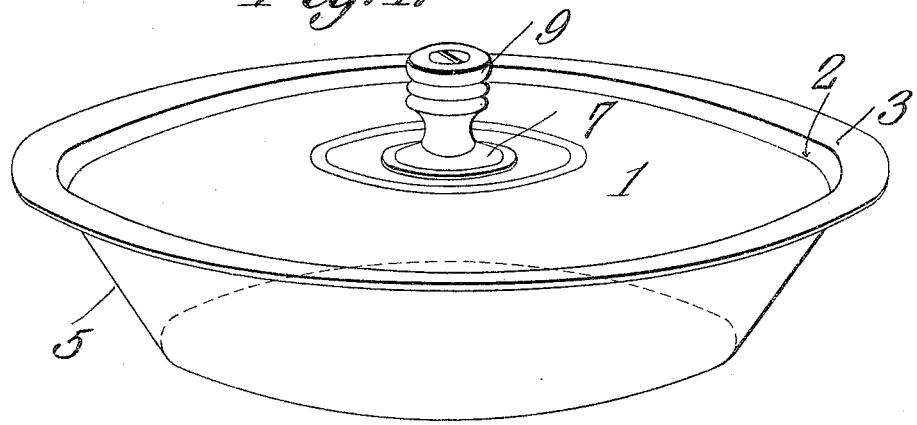
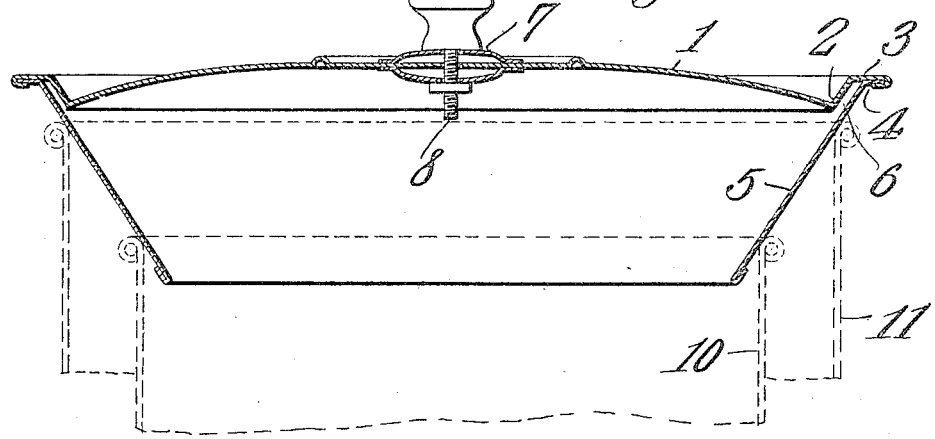
Witnesses
Inventor
Charles J. Colling.
By C. A. Snow & Co
Attorneys

UNITED STATES PATENT OFFICE.

CHARLES J. COLLING, OF BEAVER, PENNSYLVANIA.

COVER FOR COOKING UTENSILS.

No. 909,284.  Specification of Letters Patent.  Patented Jan. 12, 1909.

Application filed March 19, 1908. Serial No. 422,117.

*To all whom it may concern:*

Be it known that I, CHARLES J. COLLING, a citizen of the United States, residing at Beaver, in the county of Beaver and State of Pennsylvania, have invented a new and useful Cover for Cooking Utensils, of which the following is a specification.

This invention relates to covers for cooking utensils and the like and its object is to provide a device of this character which can be placed on receptacles of different sizes so that it does not become necessary to employ a different cover for every utensil.

A further object is to provide a cover which is so shaped that when the same is removed from a utensil and placed in an inverted position upon a stove or other support, it will retain the condensed moisture therein so that it will not run over the surface on which the cover is resting.

With these and other objects in view the invention consists of certain novel features of construction and combinations of parts which will be hereinafter more fully described and pointed out in the claim.

In the accompanying drawings is shown the preferred form of the invention.

In said drawings: Figure 1 is perspective view of a cover constructed in accordance with the present invention. Fig. 2 is a section therethrough, the positions assumed by utensils of different sizes relative thereto being indicated by dotted lines.

Referring to the figures by characters of reference, 1 designates a concavo-convex dome plate stamped from sheet metal and having an upwardly extending inclined annular flange 2 terminating in an outstanding peripheral portion 3. This peripheral portion is folded inwardly into engagement with one edge portion 4 of a frusto-conical flange 5, which extends downward from the dome plate and has its lower edge located within the bounds of the diameter of the frusto-conical portion of the dome plate. The flanges 2 and 5 are spaced apart to form an annular channel 6 therebetween.

Arranged upon the outer and inner faces of the middle portion of the dome plate are oppositely disposed concavo-convex disks 7 and the screw threaded stem 8 of a knob 9 is extended through these disks and through the dome plate, there being a nut or other device upon the stem for clamping the disks upon the dome plate.

In using the cover the same is placed upon the utensil in the usual manner and the frusto-conical flange 5 will project thereinto as indicated in Fig. 2. In this figure utensils have been indicated by dotted lines at 10 and 11. This flange 5 enables the cover to be placed upon utensils of different diameters and it thus becomes unnecessary to employ a number of covers of different sizes. Another advantage resulting from the use of this cover is the fact that any steam which might condense within the cover will be retained therein when the cover is removed and placed in an inverted position upon a stove or table and will not therefore run out onto the surface supporting it as is the case with ordinary utensil covers.

What is claimed is:

A cover for cooking utensils comprising a dome plate having an inclined peripheral flange provided with an annular outstanding portion, and a frusto-conical flange depending from said outstanding portion, the lower edge of said flange being located within the bounds of the diameter of said inclined peripheral flange, there being an annular channel between the peripheral flange and the frusto-conical flange.

In testimony that I claim the foregoing as my own, I have hereto affixed my signature in the presence of two witnesses.

CHARLES J. COLLING.

Witnesses:
 A. T. ANDERSON,
 JOHN M. SCOTT.